(12) United States Patent
Yue et al.

(10) Patent No.: US 11,694,428 B1
(45) Date of Patent: Jul. 4, 2023

(54) **METHOD FOR DETECTING *OPHIOCEPHALUS ARGUS* CANTOR UNDER INTRA-CLASS OCCULUSION BASED ON CROSS-SCALE LAYERED FEATURE FUSION**

(71) Applicant: Ludong University, Yantai (CN)

(72) Inventors: Jun Yue, Yantai (CN); Yifei Zhang, Yantai (CN); Qing Wang, Yantai (CN); Zhenbo Li, Beijing (CN); Guangjie Kou, Yantai (CN); Jun Zhang, Yantai (CN); Shixiang Jia, Yantai (CN); Ning Li, Yantai (CN)

(73) Assignee: Ludong University, Yantai (CN)

( * ) Notice: Subject to any disclaimer, the term of this patent is extended or adjusted under 35 U.S.C. 154(b) by 0 days.

(21) Appl. No.: 18/184,490

(22) Filed: Mar. 15, 2023

(30) Foreign Application Priority Data

Jul. 7, 2022 (CN) .......................... 202210796234.6

(51) Int. Cl.
| | | |
|---|---|---|
| *G06K 9/00* | (2022.01) | |
| *G06N 3/00* | (2023.01) | |
| *G06V 10/80* | (2022.01) | |
| *G06V 40/10* | (2022.01) | |
| *G06V 10/26* | (2022.01) | |

(52) U.S. Cl.
CPC .......... *G06V 10/806* (2022.01); *G06V 10/267* (2022.01); *G06V 40/10* (2022.01); *G06V 2201/07* (2022.01)

(58) Field of Classification Search
CPC .... G06V 10/806; G06V 40/10; G06V 10/267; G06V 2201/07
See application file for complete search history.

(56) References Cited

FOREIGN PATENT DOCUMENTS

| CN | 109325504 A | 2/2019 |
|---|---|---|
| CN | 111209952 A | 5/2020 |

(Continued)

OTHER PUBLICATIONS

Sung et al, "Vision based Real-time Fish Detection Using Convolutional Neural Network", 2017, Vision based real-time fish detection using convolutional neural network. In OCEANS 2017—Aberdeen (6 Pages) (Year: 2017).*

(Continued)

*Primary Examiner* — David F Dunphy
(74) *Attorney, Agent, or Firm* — Westbridge IP LLC

(57) ABSTRACT

Disclosed is a method for detecting *Ophiocephalus argus* cantor under intra-class occulusion based on cross-scale layered feature fusion, including image collecting, image processing and network model, where collected images are labeled, image sizes are adjusted to obtain input images, and the input images are input into an object detection network, integrated by convolution and inserted into cross-scale layered feature fusion modules, characterized by including dividing all features input into the cross-scale layered feature fusion modules into n layers, composed of s feature mapping subsets, and fusing features of each feature mapping subset with that of other feature mapping subsets, and connecting; carrying out convolution operation, outputting training result; adjusting network parameters by a loss function to obtain parameters for a network model; inputting final output candidate boxes into a non-maximum suppression module to screen correct prediction boxes, so that prediction result is obtained.

10 Claims, 3 Drawing Sheets

(56) References Cited

FOREIGN PATENT DOCUMENTS

| CN | 111310622 A | | 6/2020 | |
|---|---|---|---|---|
| CN | 113076871 A | | 7/2021 | |
| CN | 114170497 A | | 3/2022 | |
| CN | 114653610 A | * | 6/2022 | ............. G06F 18/24 |

OTHER PUBLICATIONS

Zhang et al, "Yolov4 High-Speed Train Wheelset Tread Defect Detection System Based on Multiscale Feature Fusion", Mar. 2022, Journal of Advanced Transportation Volume (13 Pages) (Year: 2022).*

First Office Action issued in counterpart Chinese Patent Application No. 202210796234.6, dated Aug. 12, 2022.

Zhang et al., Fish School Counting Method Based on Multi-scale Fusion and No Anchor YOLO v3, Transactions of the Chinese Society for Agricultural Machinery, vol. 52, pp. 237-244, dated Nov. 30, 2021.

Zhang et al., Yolov4 High-Speed Train Wheelset Tread Defect Detection System Based on Multiscale Feature Fusion, Journal of Advanced Transportation, vol. 2022, Article ID 1172654, dated Mar. 27, 2022.

* cited by examiner

METHOD FOR DETECTING *OPHIOCEPHALUS ARGUS* CANTOR UNDER INTRA-CLASS OCCULUSION BASED ON CROSS-SCALE LAYERED FEATURE FUSION

CROSS-REFERENCE TO RELATED APPLICATIONS

This application claims priority to Chinese Patent Application No. 202210796234.6, filed on Jul. 7, 2022, the contents of which are hereby incorporated by reference.

TECHNICAL FIELD

The present application relates to a method for detecting *Ophiocephalus argus* cantor under intra-class occulusion based on cross-scale layered feature fusion, and belongs to the technical field of deep learning.

BACKGROUND

In the technical field of deep learning, feature fusion is a commonly used image processing method. For example, in the literature Real-time Detection of Underwater Fish objects Based on Improved YOLO and transfer learning (Pattern Recognition and Artificial Intelligence, Vol. 32, No. 3, Mar. 2019), a real-time detection algorithm of underwater fish objects based on improved You Only Look Once (YOLO) and transfer learning is proposed, the method of feature fusion is used to detect multi-scale objects, and the proposed transfer learning method can obtain a trained network model with strong generalization performance. The proposed adaptive histogram equalization preprocessing algorithm based on limited contrast can remove the scattering blur of underwater images, and overcome the problem of uneven illumination, thus realizing the real-time detection of underwater fish objects by the embedded system of underwater robots.

However, the above methods still have problems. In the real-time detection of underwater fish objects based on improved YOLO and transfer learning, aiming at the fact that only one object may be detected in each sub-block of an image at most, if multiple objects appear in the sub-block, a situation of missing detection of overlapping objects may happen. A plurality of anchor points are set for an image sub-block, and each anchor point codes the coordinate value of the bounding box of the object, the confidence and category of the existing object. However, in view of the fact that the objects are similar in size and the coordinates of the center points are basically coincident, there are still cases of missing measurement.

*Ophiocephalus argus* cantor is a kind of benthic fish, with long, soft, slender and snake-like body, a cylindrical front part, and a gradually flat back part. In culture, the *Ophiocephalus argus* cantor does not keep a long strip-shape body and it is easy to cause intra-class diverse occlusion. In other words, it hides each other with various body postures. In addition, because of slender body, anchor boxes of *Ophiocephalus argus* cantor hiding or clinging to each other have large overlapping when the ground truth box is labeled or the prediction box is generated, so it is difficult to detect.

In aquaculture, especially in the aquaculture of *Ophiocephalus argus* cantor with flexible, slender and diverse bodies, it is very important to accurately detect *Ophiocephalus argus* cantor individuals under the condition of intra-class diverse occlusion. Therefore, how to improve the detection accuracy has become the research direction.

SUMMARY

Aiming at the problems existing in the prior art, a method for detecting *Ophiocephalus argus* cantor under intra-class occlusion based on cross-scale layered feature fusion is provided.

The present application solves the above technical problems through the following technical scheme.

A method for detecting *Ophiocephalus argus* cantor under intra-class diverse occlusion based on cross-scale layered feature fusion, including image collecting, image processing and a network model.

The image processing includes dividing collected images into a training set and a prediction set according to 9:1, labeling all images with labelimg to obtain images of ground truth boxes containing all objects, and size-clustering all the ground truth boxes to obtain nine ground truth box sizes most suitable for *Ophiocephalus argus* cantor detection training, and adjusting image sizes to form input images suitable for the network model;

inputting the input images into the network model, detecting the objects, extracting features of the object *Ophiocephalus argus* cantor from the input images by 1×1 convolution, and integrating the features, adjusting dimensions, inserting cross-scale layered feature fusion modules, firstly, performing a model training, inputting input images of the training set into the network model, where the input images of the training set are in the cross-scale layered feature fusion modules, dividing all features input into the modules into n layers composed of s feature mapping subsets in total, fusing features of each feature mapping subset with other feature mapping subsets, finally connecting to form complete information fusion, and after convolution operation, outputting training result containing object confidence, coordinate information and class information, where multiple cross-scale layered feature fusion modules are connected in series, in order to improve the accuracy of the network model;

then using a YOLOV4 loss function to adjust network parameters, and after 50 training iterations, obtaining the parameters suitable for the network model to form a network model for detection;

and then detecting the model, using input image of the prediction set as test images for detection, and inputting the test images into the network model with adjusted parameters, obtaining, by the network model, prediction result containing object classes, center point coordinates and width and height information of candidate boxes, and inputting the prediction result into a non-maximum suppression module, and screening, by the non-maximum suppression module, correct prediction boxes based on a ranking of locating accuracy scores of all candidate boxes.

On the basis of the above technical scheme, this application makes the following refinements and improvements to the above technical scheme.

Optionally, the image collecting is to collect images of the *Ophiocephalus argus* cantor with a size of 1920*1080 using a camera. In the images, a close proximity caused by the slender bodies of *Ophiocephalus argus* cantor forms the intra-class occlusion.

Optionally, in the detecting objects, after the information integration and dimension adjustment of the feature channels are performed by 1×1 convolution, all the features contained in the images are obtained, and the body posture of the slender *Ophiocephalus argus* cantor is extracted. At this time, the features correspond to different dimensions of a feature matrix and are independent and unrelated to each other, and each is equivalent to an independent individual.

Optionally, the cross-scale layered feature fusion modules construct a layered residual connection inside a residual block and divide all features into n layers, and all features are composed of s feature mapping subsets, that is, all features are evenly divided into s feature mapping subsets represented by $x_i$, where i={1 ,2, . . . ,s}, and each feature mapping subset $x_i$ has the same spatial size, but compared with input features, each feature mapping subset has w channels that is, n=s*w.

Optionally, the feature mapping subsets correspond to a 3×3 convolution kernel each, and an output feature is output after features are extracted by the 3×3 convolution kernel. The input features of the 3×3 convolution kernel include the feature mapping subsets corresponding to the 3×3 convolution kernel and output features formed by 3×3 convolution kernels before the 3×3 convolution kernel.

Optionally, all the output features are fused to form fused feature subsets.

Optionally, the output features are all divided into two parts, where one part is transferred to a 3×3 convolution kernel corresponding to a next unfused feature mapping subset for feature fusion, and the other part is processed after 1×1 convolution. After all the feature mapping subsets are fused, all the feature information processed by 1×1 convolution is integrated by another 1×1 convolution, and a feature aggregation is completed, so that final prediction result containing object classes, coordinate information and confidence level is obtained.

Optionally, for convolution layers of the cross-scale layered feature fusion modules, each $x_i$ is provided with a 3×3 convolution layer called and an output of $K_i$ is represented by $y_i$; in addition to $x_1$, the feature mapping subset $x_i$ plus the output features of $K_{i-1}$ are fed to $K_i$ together; when each feature mapping subset $x_i$ passes through one 3×3 convolution kernel, the output result has a larger receptive field than the originally input feature mapping subset, learns different body posture features of *Ophiocephalus argus* cantor. As a control parameter of the scale dimension, s allows learning richer characteristics of receptive field, and the computational overhead introduced by connection is neglected; the output of $K_i$ is input not only to $K_{i+1}$, but also to $K_{i+2}$, $K_{i+3}$ across scales, until to $K_s$, and the $y_i$ is represented as follows:

$$y_1 = \begin{cases} K_i(x_i) & i = 1 \\ K_i(x_i + y_{i-1} + y_{i-2} + \ldots + y_1) & 2 \leq i \leq s \end{cases} \quad \text{formula 1}$$

The cross-scale layered feature fusion inputs richer information to different scales to learn different body posture characteristics of *Ophiocephalus argus* cantor, in order to ensure that the feature information is extracted more effectively and stably in the close proximity environment of the *Ophiocephalus argus* cantor. When the feature passes through 3×3 convolution kernel, the receptive field increases, and many equivalent feature scales are generated due to a combination effect. The final output contains different numbers and combinations of different receptive fields.

Optionally, the non-maximum suppression is based on the ranking of locating accuracy scores of the prediction boxes. At the same time, with a consideration of the scores and coincidence degree of prediction boxes, the scores of prediction boxes with excessive scores are reduced. Then, according to whether an intersection over union of the prediction box with the highest score and other prediction boxes exceeds a threshold value, it is judged whether other prediction boxes are removed. If the intersection over union is greater than the threshold value, other prediction boxes are removed, and then prediction boxes of all classes circularly screened.

Optionally, firstly, finding out all the prediction boxes with scores greater than the threshold in an image. In this step the prediction boxes with low scores are screened out and deleted; then judging the score of selected prediction boxes, where the score is represented by T; according to the score, sorting the selected prediction boxes to obtain the prediction box with the highest score, and then calculating the coincidence degree between the prediction box with the highest score and all other prediction boxes. If the coincidence degree process is higher than the threshold value, the obtained intersection over union is substituted into a Gaussian exponent formula, and the Gaussian exponent is shown in formula 2:

$$e^{-\frac{iou(b_M,b_i)^2}{\sigma}} \quad \text{formula 2}$$

where e is a base number, iou is the intersection over union, $b_M$ is the prediction box with the highest score at present, $b_i$ represents the prediction boxes to be processed at present, $\sigma$ is a constant.

After substituting into the Gaussian exponent formula, the score of this prediction box is attenuated, and an attenuated score is shown in formula 3:

$$t = te^{-\frac{iou(b_M,b_i)^2}{\sigma}}, \quad \text{formula 3}$$

where e is the base number, iou is the intersection over union, $b_M$ is the prediction box with the highest score at present, $b_i$ represents the prediction boxes to be processed at present, $\sigma$ is a constant, and t is the locating accuracy scores of the prediction boxes. After new scores are obtained, the new scores replace original scores, and then all the remaining prediction boxes are repeatedly sorted and screened until final prediction boxes are obtained.

The present application has following advantages.

Firstly, the present application studies the cross-scale layered feature fusion modules, constructs layered residual connection, and represents multi-scale features with finer granularity. The cross-scale layered feature fusion modules have stronger feature extraction ability and effectively increases the receptive field of each network layer without increasing the computational load. After the cross-scale feature processing, the main feature information, such as color and texture of the *Ophiocephalus argus* cantor is effectively extracted, and the features of the *Ophiocephalus argus* cantor under diverse occlusion are accurately and quickly extracted, so as to avoid confusion with the background, improve the generalization ability of the model, and effectively improve the detection accuracy on the *Ophiocephalus argus* cantor under intra-class occlusion diverse occlusion.

Secondly, the present application proposes a method for screening correct prediction boxes based on the ranking of locating accuracy scores of all prediction boxes. According to the method, aiming at the problems of easy clinging to each other, and diversified occlusion among *Ophiocephalus argus* cantor due to slender body, false prediction boxes are accurately screened out, and the situation that the correct prediction boxes are mistakenly rejected due to too high coincidence degree is avoided. In this method, the coincidence degree of all candidate boxes and the prediction boxes is ranked first, instead of ranking only by the probability of judging classes, and the prediction box with the highest score is obtained. Then, the coincidence degree between the prediction box with the highest score and all other prediction boxes is calculated. If the coincidence degree is higher than the threshold, the obtained intersection over union is substituted into Gaussian exponent formula for subsequent non-maximum suppression, so real prediction boxes are prevented from being screened out due to excessive overlap of prior bounding boxes effectively, thus improving the detection accuracy.

DETAILED DESCRIPTION OF THE EMBODIMENTS

In order to better explain the technical scheme in this application, the scheme of this application is specifically explained below, taking *Ophiocephalus argus* cantor as an object.

The present application takes images of *Ophiocephalus argus* cantor in the juvenile stage as research objects, and studies a method for detecting *Ophiocephalus argus* cantor under intra-class diverse occlusion based on cross-scale layered feature fusion, including image collecting, image processing and a network model.

Figure 1:
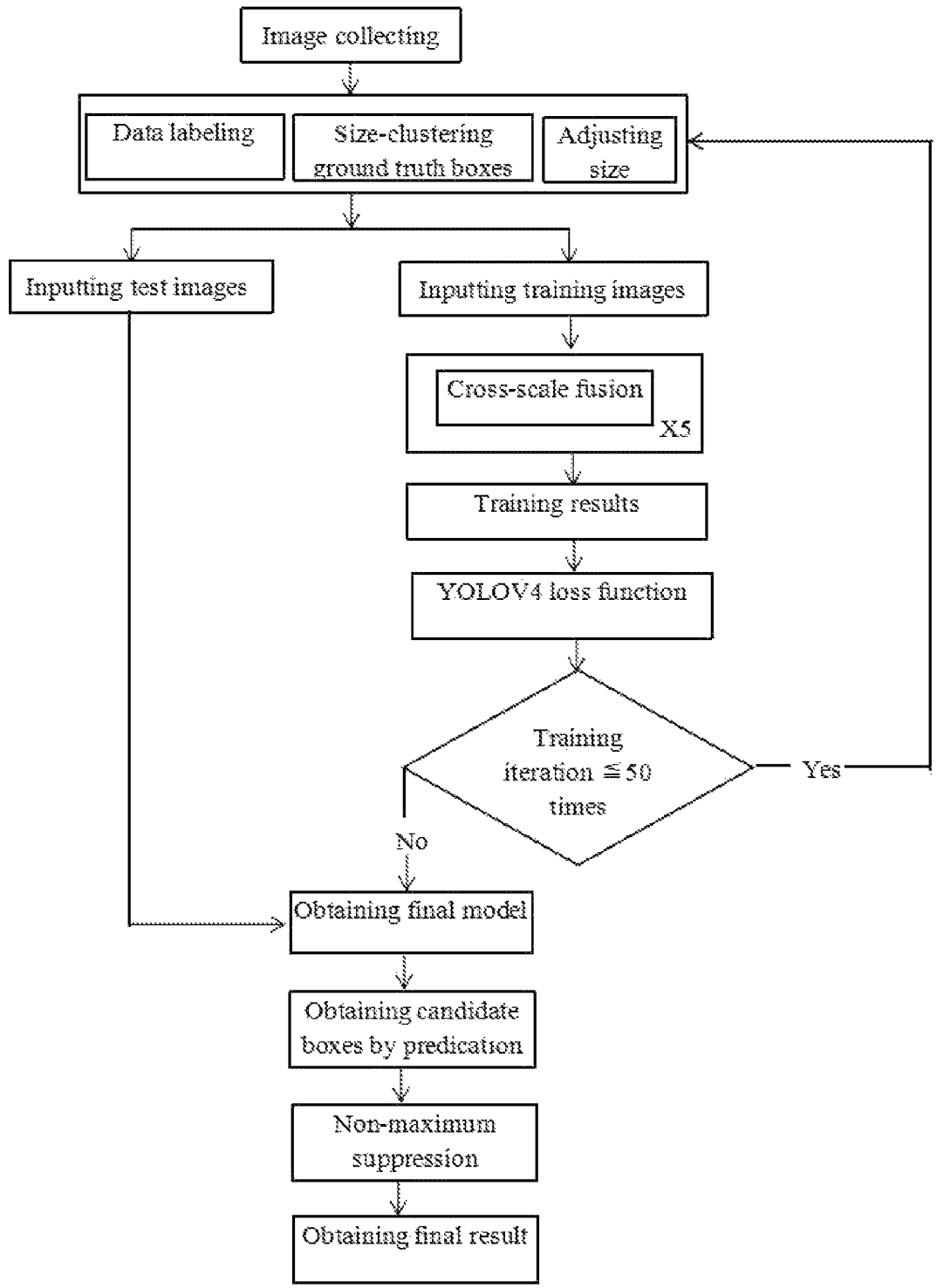
FIG. 1 is a system structure diagram of a detection module.
Figure 2:
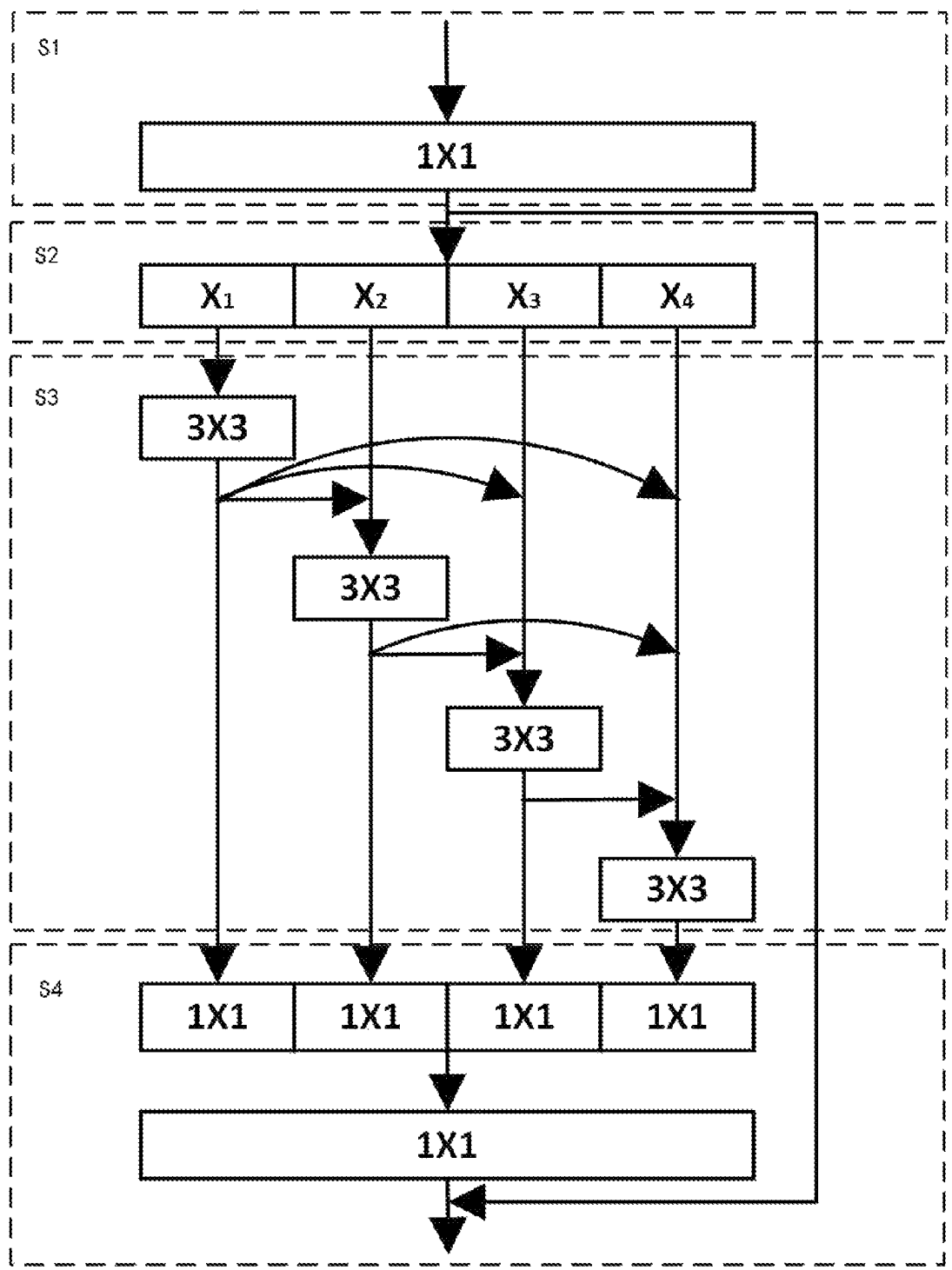
FIG. 2 is a structure diagram of cross-scale layered feature fusion modules.
Figure 3:
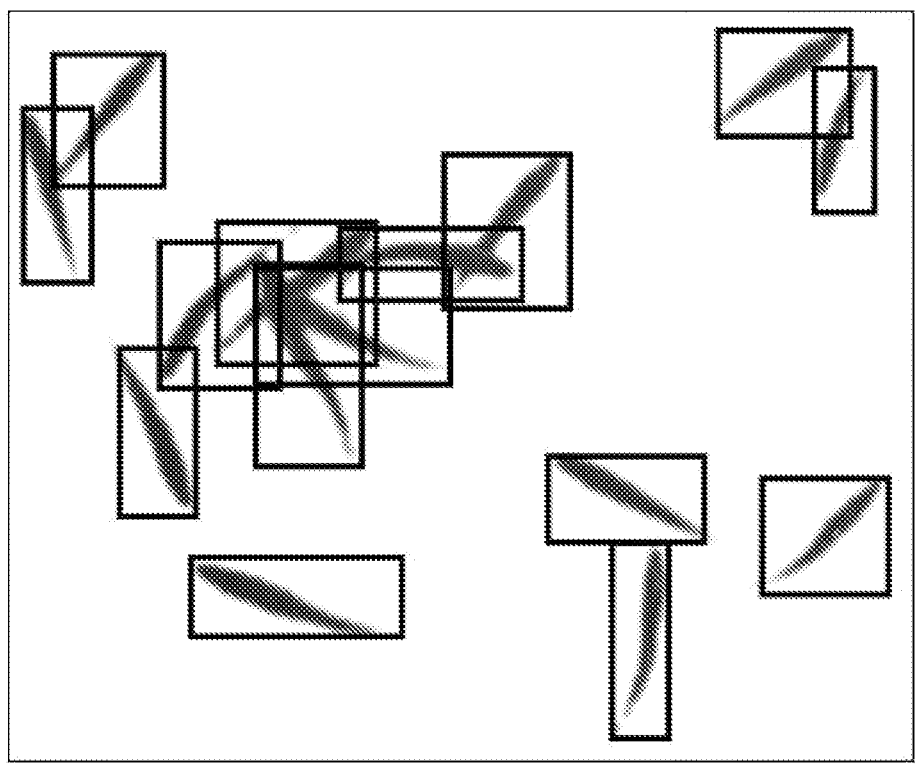
FIG. 3 shows an effect of fish detection by using the method of the present application.

With reference to in FIG. 1 and FIG. 2, the image collecting is as follows: the images of cultured *Ophiocephalus argus* cantor collected by a camera are 1920*1080 in size, and *Ophiocephalus argus* cantor is slender. In the process of fish school swimming, *Ophiocephalus argus* cantor are close to each other, so in the photos taken, *Ophiocephalus argus* cantor are closely adjacent to each other, and there is occlusion within the class.

The image processing: on the one hand, the collected images are labeled with labelimg, and images of ground truth boxes containing all objects are gotten; on the other hand, candidate boxes for network prediction are obtained by adjusting initially set prior bounding boxes, and the *Ophiocephalus argus* cantor is slender, so anchor boxes are also short and long or slim and tall. If the prior bounding boxes are not adjusted, the prediction of the prior bounding boxes is affected. Therefore, all the ground truth boxes are size-clustered to get the nine anchor box sizes most suitable for the network training of *Ophiocephalus argus* cantor detection, and the image size is adjusted to form the input images, so that the image are suitable for a network model. Specifically, the input images are *Ophiocephalus argus* cantor images with intra-class occlusion, and the image size is adjusted to 608*608.

The network model: the images are input into an object detection network, and features are extracted by 1×1 convolution, and then information is integrated and dimensions are adjusted to obtain a feature matrix A: [2, 64, 608, 608], in which a first dimension is two classes, *Ophiocephalus argus* cantor and background, a second dimension is a feature channel, containing color information, texture information and correlation information among *Ophiocephalus argus* cantor, and a third dimension and a fourth dimension are image width and height. The feature matrix A is inserted into cross-scale layered feature fusion modules, and all features are evenly divided into s feature mapping subsets. Features of each subset are fused with each other, and finally the information is integrated. After the convolution operation, candidate boxes containing object confidence degree, coordinate information and class information are output. Network parameters are adjusted several times by a loss function, and parameters suitable for the network model are obtained. Finally, candidate boxes enter a non-maximum suppression module based on a ranking of locating accuracy scores of all prediction boxes to screen the correct prediction boxes, all the candidate boxes generated in the previous step are screened through non-maximum suppression, and the wrong candidate boxes are screened out, so as to keep the real prediction boxes and obtain the final prediction result.

Specifically, the cross-scale layered feature fusion modules construct layered residual connection inside a residual block to represent multi-scale features with finer grain and has stronger feature extraction ability and effectively increases the receptive field of each network layer without increasing the computational load.

In network model, a cross-scale layered feature fusion network is realized by four steps: S1, using the images of *Ophiocephalus argus* cantor with intra-class diverse occlusion as the input images of this module, carrying out information integration and dimension adjustment of the feature channel by 1×1 convolution, obtaining all the features contained in the images, and obtaining the feature matrix A : [2, 64, 608, 608], where the first dimension is two classes, *Ophiocephalus argus* cantor and background, and the second dimension is the feature channel, containing containing color information, texture information and correlation information among *Ophiocephalus argus* cantor, and the third dimension and the fourth dimension are image width and height. At this time, the features are independent and unrelated to each other, such as color, texture, background, and are equivalent to independent individuals.

S2, constructing, by the cross-scale layered feature fusion modules, a layered residual connection inside the residual block, and dividing all the features into n layers and s feature mapping subsets in total, where all features are equally divided into s feature mapping subsets represented by $x_i$: [2, 64/s, 608, 608]. The first dimension is the number of classes, and the second dimension is the feature channel, where i={1 ,2, . . . ,s}, and each feature mapping subset $x_i$ has the same space size, but compared with input features, each feature mapping subset has w channels, where n=s*w.

S3, inputting features of a first feature mapping subset into a 3×3 convolution kernel corresponding to this feature mapping subset to extract features, and the obtaining an output feature matrix $y_i$ of this feature mapping subset: [2, 64/s, 608, 608]; then, inputting the output y1 and a second feature mapping subset $x_2$: [2, 64/s, 608, 608] together into a 3×3 convolution kernel corresponding to the second feature mapping subset, and outputting an output $y_2$ of the second feature mapping subset: [2, 2*64/s, 608, 608]; inputting the output y1 of the first feature mapping subset, the output $y_2$ of the second feature mapping subset and a third feature mapping subset $x_3$: [2, 64/s, 608,608] together into a 3×3 convolution kernel corresponding to the third feature mapping subset and outputting an output $y_3$ of the third feature mapping subset: [2, 4*64/s, 608, 608]; and processing all feature mapping subsets in the same way and obtaining output features corresponding to all feature mapping subsets. In this way, the processing realizes the fusion of features and the enrichment of information and the output features of each feature mapping subset are also connected to each subsequent feature mapping subset across scales.

That is: each feature mapping subset $x_i$ is provided with a 3×3 convolution layer called $K_i$. The output feature of $K_i$, is represented by $y_i$, and $y_i$, is the output feature. The mapping subset $x_i$ plus the output features of $K_{i-1}$ are fed into $K_i$, together. When each feature mapping subset $x_i$ passes through a $K_i$, the output $y_i$, has a larger receptive field than the original input features. As a control parameter of scale dimension, a larger S allows us to learn the characteristics of richer receptive fields, while the computational overhead introduced by connection is neglected. The output of $K_i$, is input not only to $K_{i+1}$, but also to $K_{i+2}$, $K_{i+3}$ across scales, until to $K_s$, where $y_i$, is represented as follows:

$$y_1 = \begin{cases} K_i(x_i) & i=1 \\ K_i(x_i + y_{i-1} + y_{i-2} + \ldots + y_1) & 2 \le i \le s \end{cases} \quad \text{formula 1}$$

Cross-scale layered feature fusion inputs richer information to different scales, and learns different body posture features of *Ophiocephalus argus* cantor, so as to ensure more effective and stable extraction of feature information in the environment of intra-class diverse occlusion. When features pass through 3×3 convolution kernels, receptive fields are increased, and many equivalent feature scales are produced due to the combination effect. The final output contains different quantity and combinations of different receptive fields.

Cross-scale layered feature fusion enables the network to obtain more color texture and diverse body posture information of *Ophiocephalus argus* cantor. Using the obtained color texture and diverse body posture information to detect the prior bounding box location of *Ophiocephalus argus* cantor is more accurate and closer to the actual location of *Ophiocephalus argus* cantor, thus improving the detection accuracy of *Ophiocephalus argus* cantor under the condition of intra-class diverse occlusion.

S4, not only carrying out 1×1 convolution the fused output features, but also inputting the fused output features to the subsequent feature mapping subset, and then inputting to the convolution kernel corresponding to the subsequent feature mapping subset for feature fusion, where the output features are subjected to 1×1 convolution, processed with information, and uniformly adjusted to feature matrix [2, 64, 208, 208]. After all feature mapping subsets complete feature fusion, all output features are processed by 1×1 convolution to obtain corresponding feature information, and all feature information is integrated by an integration convolution kernel to obtain fused feature subsets. The integration convolution is 1×1 convolution, and integrates all information to complete feature aggregation, and the obtained fused feature subset contains object classes, coordinate information and final prediction result Y: [2, 64, 208, 208], where the second dimension contains all the features of the *Ophiocephalus argus* cantor images, and prediction box location information thereof, species information and confidence information.

The non-maximum suppression module for screening is based on the ranking of locating accuracy scores of the prediction boxes.

Most of object detection algorithms have many densely distributed prior bounding boxes. Most of object detection algorithms have many densely distributed prior bounding boxes. After prediction result is obtained, the prediction result is adjusted by combining the prior bounding boxes to get the final detection result. Therefore, the same object may generate multiple prediction boxes. Because of slender and soft body, *Ophiocephalus argus* cantor have various body postures, which leads to the intra-class diverse occlusion. Besides, *Ophiocephalus argus* cantor is easy to cling to each other directly, which makes ground truth boxes of the *Ophiocephalus argus* cantor very close and dense, and values of the prediction boxes between *Ophiocephalus argus* cantor easily exceed the threshold, resulting in the false rejection of the prediction boxes.

With the non-maximum suppression based on the ranking of locating accuracy scores of the prediction boxes, and a consideration of scores and coincidence degree of the prediction boxes, instead of simply and rudely screening out the prediction boxes with too large coincidence degree, the scores of the prediction boxes with too high score are reduced; then, according to whether the intersection over union of the prediction box with the highest score and other prediction boxes exceeds a set threshold value 0.7, it is judged whether to remove other prediction boxes, where if the intersection over union is greater than the threshold value, other prediction boxes are removed; and then prediction boxes of all classes are circularly screened.

In this method, intersection over union scores, which represent both the scores and the locating accuracy, is used as the basis of ranking, and the confidence score and the locating accuracy score are fused, so that the prediction boxes are sorted more accurately and effectively, and thus the prediction boxes are screened out more accurately, and redundant prediction boxes are eliminated.

Since there is only one kind of *Ophiocephalus argus* cantor object detection, it is no longer necessary to circulate the classes in the process of screening, only one kind of *Ophiocephalus argus* cantor needs to be followed up by the algorithm. The method firstly finds out all the prediction boxes with scores greater than the threshold in an image, and this step filters and deletes the prediction boxes with low scores; then, the scores of the selected prediction boxes are judged, and the scores are represented by t. According to the scores, the selected prediction boxes are sorted to get the prediction box with the highest score, and then the coincidence degree is calculated between the prediction box with the highest score and all other prediction boxes. If the coincidence degree process is higher than the threshold value, the obtained intersection over union is substituted into a Gaussian exponent formula. The Gaussian exponent is shown in formula 2:

$$e^{-\frac{iou(b_M, b_i)^2}{\sigma}}, \quad \text{formula 2}$$

where e is a base number, iou is the intersection over union, $b_M$ is the prediction box with the highest score at present, $b_i$ represents the prediction box to be processed at present, and $\sigma$ is a constant.

After substituting into the Gaussian exponent formula, the score of this prediction box attenuates, and an attenuated score is shown in formula 3:

$$t = te^{-\frac{iou(b_M, b_i)^2}{\sigma}}, \quad \text{formula 3}$$

where e is a base number, iou is the intersection over union, $b_M$ is the prediction box with the highest score at present, $b_i$ represents the prediction boxes to be processed at present, $\sigma$ is a constant, and t is the locating accuracy score of prediction boxes, and after new scores are obtained, the new scores replace original scores. Then, all reserved prediction boxes are sorted and screened repeatedly until final prediction boxes are obtained.

The non-maximum suppression module based on the ranking of locating accuracy scores of the prediction boxes is not only suitable for the object detection of *Ophiocephalus argus* cantor with only one kind, but also for the slender body characteristics of *Ophiocephalus argus* cantor, effectively suppresses a situation that two closely adjacent prediction result are mistaken for different prediction result of one object. This method improves the accuracy of object detection of *Ophiocephalus argus* cantor under intra-class diverse occlusion.

Combined the above-mentioned network model and non-maximum suppression module, the object detection of *Ophiocephalus argus* cantor under the condition of intra-class diverse occlusion is realized, so as to solve the problem of precision reduction caused by the large overlapping degree and dense prediction boxes caused by the similar color, texture and diverse body posture of *Ophiocephalus argus* cantor under the condition of intra-class occlusion. The processed images of *Ophiocephalus argus* cantor are transmitted to the *Ophiocephalus argus* cantor detection module, and the cross-scale layered feature fusion modules make the network collect richer features such as color, texture and diverse body posture, strengthen the correlation among features, and improve the accuracy of *Ophiocephalus argus* cantor detection under diverse occlusion of *Ophiocephalus argus* cantor and similar color and texture; by using the non-maximum suppression module based on the ranking of locating accuracy scores of the prediction boxes, when generated prediction boxes are dense and has a large overlap with the ground truth boxes, the situation that the correct prediction boxes are wrongly rejected is avoided, an existence probability of the correct prediction boxes is effectively improved, and the detection accuracy of *Ophiocephalus argus* cantor is improved.

The input imaged are input to the cross-scale layered feature fusion modules, the cross-scale layered feature fusion modules read all the features of the images and fuses all the features according to the method. In order to ensure the full fusion and efficient utilization of features, five cross-scale layered feature fusion modules are set up, and then the fused features are output. The fused feature information is integrated into a prediction result containing the object classes, coordinate information and confidence of the object classes. The generated prediction result and the ground truth boxes labeled in advance are fine-tuned by YOLOV4 loss function, the location information of the prediction boxes is adjusted, and the training is re-conducted until the number of training iterations is used up, and the final prediction result is obtained.

The above is only a preferred embodiment of the present application, and it is not intended to limit the present application. Any modification, equivalent substitution, improvement, etc. made within the spirit and principle of the present application should be included in the scope of protection of the present application.

What is claimed is:

1. A method for detecting *Ophiocephalus argus* cantor under intra-class occulusion based on cross-scale layered feature fusion, comprising image collecting, image processing and a network model;
   wherein the image processing comprises dividing collected images into a training set and a prediction set according to 9:1, labeling all images with labelimg to obtain images of ground truth boxes containing all objects, and size-clustering all the ground truth boxes to obtain nine ground truth box sizes most suitable for *Ophiocephalus argus* cantor detection training, and adjusting image sizes to form input images, wherein the input images are suitable for the network model;
   inputting the input images into the network model, detecting the objects, extracting features of the object *Ophiocephalus argus* cantor from the input images by 1×1 convolution, and integrating the features, adjusting dimensions, inserting cross-scale layered feature fusion modules,
   which is characterized in that,
   firstly, performing a model training, inputting input images of the training set into the network model, wherein the input images of the training set are in the cross-scale layered feature fusion modules, dividing all features input into the modules into n layers composed of s feature mapping subsets in total, fusing features of each feature mapping subset with other feature mapping subsets, finally connecting to form complete information fusion, and after convolution operation, outputting training result containing object confidence, coordinate information and class information;
   then using a YOLOV4 loss function to adjust network parameters, and after 50 training iterations, obtaining parameters suitable for the network model to form a network model for detection; and
   then detecting the model, using input image of the prediction set as test images for detection, and inputting the test images into the network model with adjusted parameters, obtaining, by the network model, prediction result containing object classes, center point coordinates and width and height information of candidate boxes, and inputting the prediction result into a non-maximum suppression module, and screening, by the non-maximum suppression module, correct prediction boxes based on a ranking of locating accuracy scores of all candidate boxes.

2. The method for detecting *Ophiocephalus argus* cantor under intra-class occulusion based on cross-scale layered feature fusion according to claim 1, wherein the image collecting is to collect images of the *Ophiocephalus argus* cantor with a size of 1920*1080 using a camera, wherein in the images, a close proximity caused by slender bodies of *Ophiocephalus argus* cantor forms the intra-class occlusion.

3. The method for detecting *Ophiocephalus argus* cantor under intra-class occulusion based on cross-scale layered feature fusion according to claim 2, wherein in the detecting objects, after an information integration and a dimension adjustment of feature channels are performed by 1×1 convolution, all the features contained in the images are obtained, and a body posture of the slender *Ophiocephalus argus* cantor is extracted, wherein at this time, the features correspond to different dimensions of a feature matrix and are independent and unrelated to each other, and each is equivalent to an independent individual.

4. The method for detecting *Ophiocephalus argus* cantor under intra-class occulusion based on cross-scale layered feature fusion according to claim 3, wherein the cross-scale layered feature fusion modules construct a layered residual connection inside a residual block and divide all features into n layers, composed of s feature mapping subsets, wherein the all features are evenly divided into s feature mapping subsets represented by $x_i$, wherein i={1,2,...,s}, and each feature mapping subset $x_i$ has the same spatial size, but compared with input features, each feature mapping subset has w channels, n=s*w.

5. The method for detecting *Ophiocephalus argus* cantor under intra-class occulusion based on cross-scale layered feature fusion according to claim 4, wherein the feature mapping subsets correspond to a 3×3 convolution kernel each, and an output feature is output after features are extracted by the 3×3 convolution kernel; input features of the 3×3 convolution kernel comprise the feature mapping subsets corresponding to the 3×3 convolution kernel and output features formed by 3×3 convolution kernels before the 3×3 convolution kernel.

6. The method for detecting *Ophiocephalus argus* cantor under intra-class occulusion based on cross-scale layered feature fusion according to claim 5, wherein all the output features are fused to form fused feature subsets.

7. The method for detecting *Ophiocephalus argus* cantor under intra-class occulusion based on cross-scale layered feature fusion according to claim 6, wherein the output features are all divided into two parts, wherein one part is transferred to a 3×3 convolution kernel corresponding to a next unfused feature mapping subset for feature fusion, and the other part is processed after 1×1 convolution; after all the feature mapping subsets are fused, all the feature information processed by the 1×1 convolution is integrated by another 1×1 convolution, and an feature aggregation is completed, so that final prediction result containing object classes, coordinate information and confidence level is obtained.

8. The method for detecting *Ophiocephalus argus* cantor under intra-class occulusion based on cross-scale layered feature fusion according to claim 4, wherein for convolution layers of the cross-scale layered feature fusion modules, each $x_i$ is provided with a 3×3 convolution layer called $K_i$, and an output of $K_i$ is represented by $y_i$; in addition to the $x_1$, the feature mapping subset $x_i$ plus the output features of $K_{i-1}$ are fed to $K_i$ together; the output of $K_i$ is input not only to $K_{i+1}$, but also to $K_{i+2}$, $K_{i+3}$ across scales, until to $K_s$, wherein the $y_i$ is represented as follows:

$$y_1 = \begin{cases} K_i(x_i) & i = 1 \\ K_i(x_i + y_{i-1} + y_{i-2} + \ldots + y_1) & 2 \leq i \leq s \end{cases} \quad \text{formula 1}$$

9. The method for detecting *Ophiocephalus argus* cantor under intra-class occulusion based on cross-scale layered feature fusion according to claim 8, wherein the non-maximum suppression is based on a ranking of locating accuracy scores of the prediction boxes, and scores and coincidence degree of the prediction boxes are considered, the scores of the prediction boxes with too high score are reduced; then, according to whether an intersection over union of a prediction box with the highest score and other prediction boxes exceeds a threshold value, other prediction boxes are judged about whether to be removed, wherein if the intersection over union is greater than the threshold value, other prediction boxes are removed; and then all classes prediction boxes of all classes circularly screened.

10. The method for detecting *Ophiocephalus argus* cantor under intra-class occulusion based on cross-scale layered feature fusion according to claim 9, wherein firstly all prediction boxes with scores greater than the threshold in an image are found out; then scores of selected prediction boxes are judged, represented by t; according to the scores, the selected prediction boxes are sorted to obtain the prediction box with the highest score; and then the coincidence degree between the prediction box with the highest score and all other prediction boxes is calculated, wherein if a coincidence degree process is higher than the threshold value, the obtained intersection over union is substituted into a Gaussian exponent; the Gaussian exponent is shown in formula 2:

$$e^{-\frac{iou(b_M,b_i)^2}{\sigma}}, \quad \text{formula 2}$$

wherein in the formula 2, e is a base number, iou is the intersection over union, $b_M$ is the prediction box with the highest score at present, $b_i$ represents prediction boxes to be processed at present, σ is a constant;

after substituting into the Gaussian exponent, the score of this prediction box is attenuated, and an attenuated score is shown in formula 3:

$$t = te^{-\frac{iou(b_M,b_i)^2}{\sigma}}, \quad \text{formula 3}$$

wherein in the formula 3, e is the base number, iou is the intersection over union, $b_M$ is the prediction box with the highest score at present, $b_i$ represents the prediction box to be processed at present, σ is a constant, and t is the locating accuracy scores of the prediction boxes; after new scores are obtained, the new scores replace original scores, and then all reserved prediction boxes are repeatedly sorted and screened until final prediction boxes are obtained.

\* \* \* \* \*